March 13, 1928.
H. G. BRUNER
HOSE NIPPLE
Filed Aug. 30, 1923
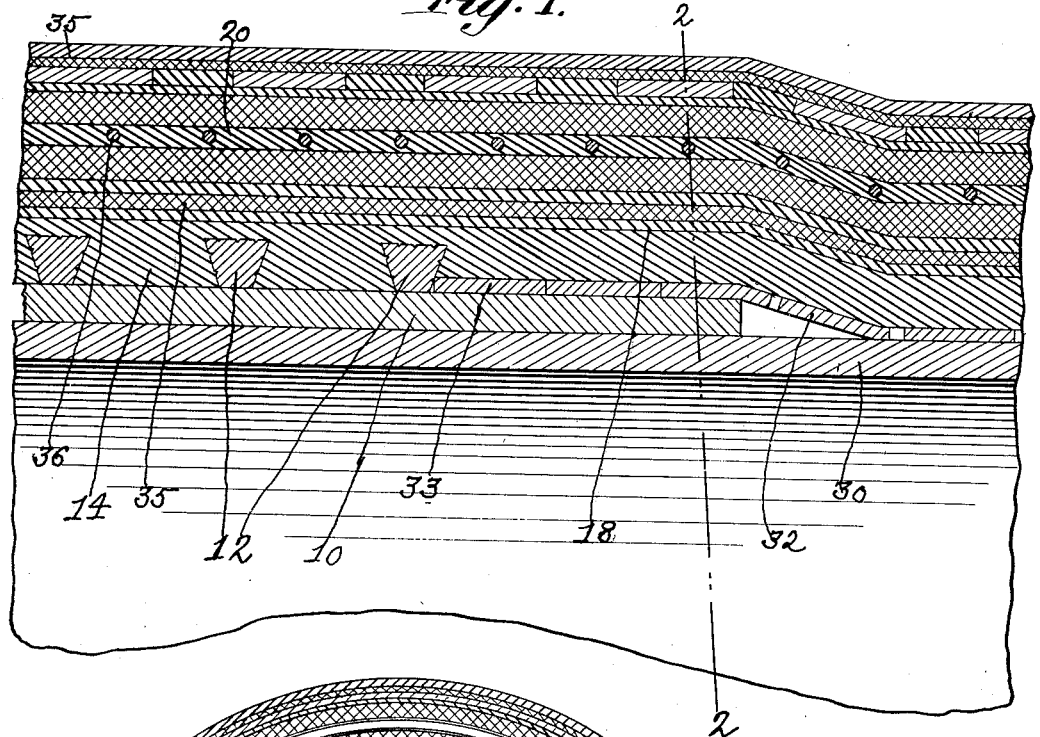
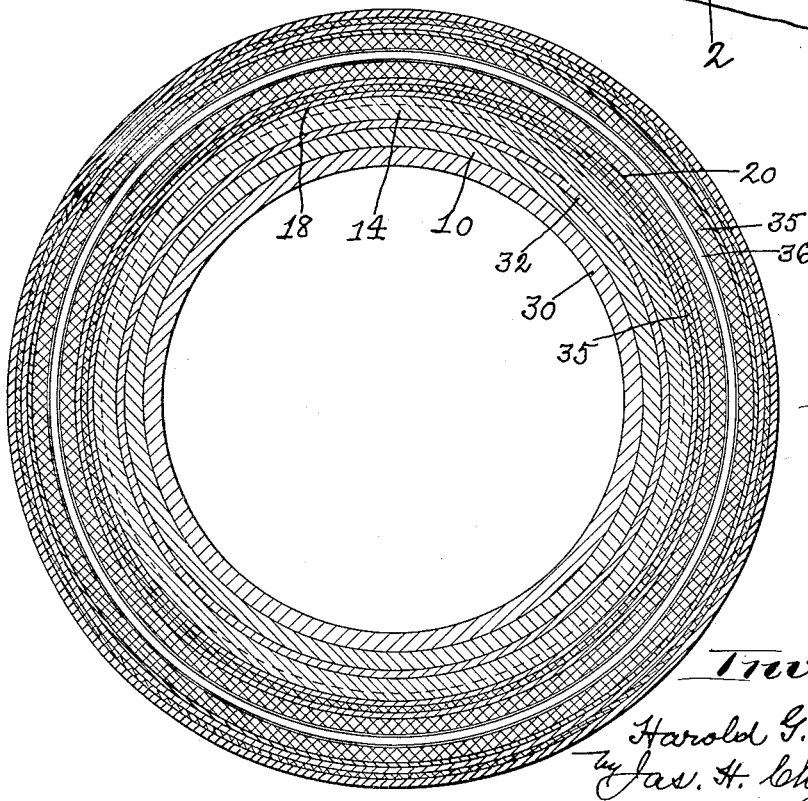
Inventor:
Harold G. Bruner
by Jas. H. Churchill
Atty.

Patented Mar. 13, 1928.

1,662,051

UNITED STATES PATENT OFFICE.

HAROLD G. BRUNER, OF WAKEFIELD, MASSACHUSETTS, ASSIGNOR TO BOSTON WOVEN HOSE & RUBBER COMPANY, OF CAMBRIDGE, MASSACHUSETTS, A CORPORATION OF MASSACHUSETTS.

HOSE NIPPLE.

Application filed August 30, 1923. Serial No. 660,158.

This invention relates to a rubber hose, and more particularly to rubber hose provided with a nipple, and has for an object to provide a novel and improved hose of the character specified which is particularly adapted for use in the transmission of liquids under high pressure without leakage and in which a fluid tight joint between the hose and nipple is effected without the use of mechanical clamping means.

To these ends the nipple, preferably a metal tube, is provided with one or more rigid locking members attached thereto and projecting from the exterior thereof, and which cooperate with members of a relatively hard material secured to and projecting from the interior of the hose to lock the hose upon the nipple. In the preferred construction, the locking members may and preferably will be welded to the nipple and embedded in a sleeve of hard rubber composition vulcanized to the nipple and to the locking members to form a fluid tight joint. A second layer of a relatively soft rubber composition may and preferably will be interposed between said relatively hard sleeve and the fabric or body of the hose and vulcanized to both.

These and other features of this invention will be hereinafter described and particularly pointed out in the claims at the end of this specification.

In the drawings illustrating the preferred embodiment of the invention, Fig. 1 is a longitudinal section of a portion of a hose and nipple, and also of the mandrel upon which the hose may be made; and Fig. 2 is a section on line 2—2 of Fig. 1.

Referring to the drawings, 10 represents a portion of a hose nipple preferably comprising a metal tube provided upon its external surface with one or more rigid locking projections 12. As herein shown, the locking projections 12 comprise wedge shaped rings of metal welded or otherwise secured to the external surface of the nipple 10. The locking projections 12 upon the nipple 10 are arranged to engage and cooperate with a body 14 of relatively hard material upon the interior of the hose to securely fasten the hose upon the nipple and to form a fluid tight joint capable of withstanding heavy fluid pressure without leakage and without necessitating the use of clamps.

In practice, the metal locking projections 12 upon the nipple may and preferably will be embedded and vulcanized in a sleeve of hard rubber composition and of substantial thickness, as shown in Fig. 1. A layer 18 of a relatively soft rubber composition may and preferably will be interposed between the relatively hard sleeve 14 and the fabric or body portion 20 of the hose and vulcanized to both. This intermediate resilient and more or less flexible layer 18 serves to impart sufficient flexibility to the hose construction to insure the durability of the joint between the hose and the nipple.

In the preferred method of manufacturing the improved hose, the nipple 10 is first cleaned to remove the scale therefrom, and the exterior surface of the nipple is scored or roughened in any suitable manner. The nipple 10 is then preferably boiled in alkali to remove the grease therefrom, and washed and dried, and thereafter dipped into a copper sulphate solution, removed and dried. Next two or three coats of rubber cement are applied, allowing each coat to dry before the application of the succeeding coat, after which the nipple in this condition is placed upon the usual mandrel 30 upon which the rubber hose is to be formed, and which in practice comprises a pipe 25 or 30 feet long, the nipple being fastened thereon in any convenient manner, as for example, by means of rubber tape. Flat wire 32 is then wound upon the mandrel to form the interior of the body of the hose, and one or more turns 33 thereof are wound upon the inner end of the nipple, as shown in Fig. 1. After the wire 32 has been wound upon the mandrel and the ends 33 thereof wound upon the nipple tube 10, it is given a coat of rubber cement, and the rubber dough comprising the basis for the formation of the relatively hard inner sleeve 14 is applied over the wire coil and the nipple to cover the wedge shaped locking projections 12, and shaped to form the sleeve 14. The rubber dough used for this purpose may and preferably will be of the usual composition utilized in the formation of substantially hard rubber upon vulcanization and is applied to the nipple in the form of a dough which is plastic and capable of being shaped by hand to form the sleeve 14 and to taper the latter off to meet the wire coil in proximity to the nipple, prior to being vulcanized. A second layer of dough and a rubber composition capable of forming upon vulcanization the softer and relatively flexible layer 18 is then applied to the sleeve 14, and thereafter the canvas or duck wrapping 35 and their reinforcements 36 are applied to the layer 18 in the manner usually employed at present in the manufacture of hose. The hose thus formed is then subjected to vulcanization while remaining upon the mandrel, and the inner sleeve hardened to form a relatively hard mass in which the wedge shaped locking projections 12 are embedded with their widest outer ends within said hard mass and interlocked therewith. The relatively hard sleeve 14 is not only mechanically locked upon the nipple, but also is vulcanized to both the nipple 10 and the locking projections 12 to provide a fluid tight joint capable of withstanding relatively high fluid pressure without leakage.

While the preferred embodiment of the invention has been illustrated and described, it will be understood that the invention may be embodied in other forms within the scope of the following claims.

Having thus described the invention, what is claimed is:

1. The combination of a hose nipple provided with a locking device, of a hose upon the nipple having a flexible body portion provided with a non-flexible inner member affixed to said flexible body portion to form part thereof and surrounding said nipple, said locking device on the nipple being embedded in the non-flexible inner member to be enveloped by the latter and lock the hose fluid-tight upon the nipple.

2. A hose nipple comprising a nipple provided upon its exterior with a plurality of locking projections, a sleeve of relatively hard material having projections on the interior cooperating and interlocking with the locking projections on the nipple, and a rubber hose vulcanized to said relatively hard sleeve.

3. A hose nipple comprising a nipple provided upon its exterior with a plurality of locking projections, a sleeve of relatively hard rubber material having projections on its interior which interlock with the projections upon the nipple and vulcanized thereto, a sleeve of relatively soft rubber material vulcanized to the hard sleeve, and a hose vulcanized to said relatively soft sleeve.

4. A hose nipple comprising a nipple, a hose having one end extended over the nipple and a dovetailed connection between the wall of the hose and the nipple for locking the hose fluid-tight upon the nipple, said dovetailed connection comprising substantially web-shaped projections on the nipple having their outer ends widest and embedded in the wall of the hose.

In testimony whereof, I have signed my name to this specification.

HAROLD G. BRUNER.